United States Patent
Dewes

(10) Patent No.: US 8,945,388 B2
(45) Date of Patent: Feb. 3, 2015

(54) FILTER

(75) Inventor: Markus Dewes, Oberthal (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 201 days.

(21) Appl. No.: 13/261,254

(22) PCT Filed: Oct. 27, 2010

(86) PCT No.: PCT/EP2010/006572
§ 371 (c)(1),
(2), (4) Date: Apr. 6, 2012

(87) PCT Pub. No.: WO2011/057716
PCT Pub. Date: May 19, 2011

(65) Prior Publication Data
US 2012/0199529 A1    Aug. 9, 2012

(30) Foreign Application Priority Data
Nov. 10, 2009   (DE) .................. 10 2009 052 613

(51) Int. Cl.
| | | |
|---|---|---|
| *B01D 27/14* | (2006.01) |
| *B01D 29/54* | (2006.01) |
| *B01D 29/58* | (2006.01) |
| *B01D 29/88* | (2006.01) |
| *B01D 46/00* | (2006.01) |

(52) U.S. Cl.
CPC .............. *B01D 29/54* (2013.01); *B01D 29/58* (2013.01); *B01D 29/88* (2013.01); *B01D 46/0008* (2013.01); *B01D 2201/04* (2013.01)
USPC ........ 210/342; 210/323.1; 210/335; 210/337; 210/338

(58) Field of Classification Search
CPC ........ B01D 27/04; B01D 27/06; B01D 27/07; B01D 27/144; B01D 27/148; B01D 29/54; B01D 29/58
See application file for complete search history.

(56) References Cited

U.S. PATENT DOCUMENTS

| | | | |
|---|---|---|---|
| 4,990,248 A | 2/1991 | Brown et al. | |
| 7,837,754 B2 * | 11/2010 | Johnson et al. | .................. 55/482 |
| 2004/0055939 A1 | 3/2004 | Wybo | |
| 2005/0155585 A1 | 7/2005 | Bradford | |
| 2006/0191832 A1 | 8/2006 | Richie et al. | |

FOREIGN PATENT DOCUMENTS

| | | |
|---|---|---|
| DE | 3103723 | 9/1982 |
| EP | 1918006 | 5/2008 |
| WO | 2007110049 | 10/2007 |

* cited by examiner

*Primary Examiner* — Benjamin Kurtz
(74) *Attorney, Agent, or Firm* — Roylance, Abrams, Berdo & Goodman LLP

(57) ABSTRACT

A filter has first and second filter media (2, 3). The filter media define a flow space (4) between them receiving a device (5) for separation and flow guidance and dividing the flow space such that a functional space (25, 26) is disposed adjacent to the first or the second filter medium. The first filter medium (2) defines a hollow space (21) toward the outside, and the second filter medium (3) defines a hollow space (22) toward the inside. Each of the hollow spaces (21, 22) can be connected to at least one fluid duct (23, 24). The flow space (4) including the two functional spaces (25, 26) can be connected to at least one further fluid duct (27) that is separated in a fluid-tight manner from the other fluid ducts (23, 24).

4 Claims, 1 Drawing Sheet

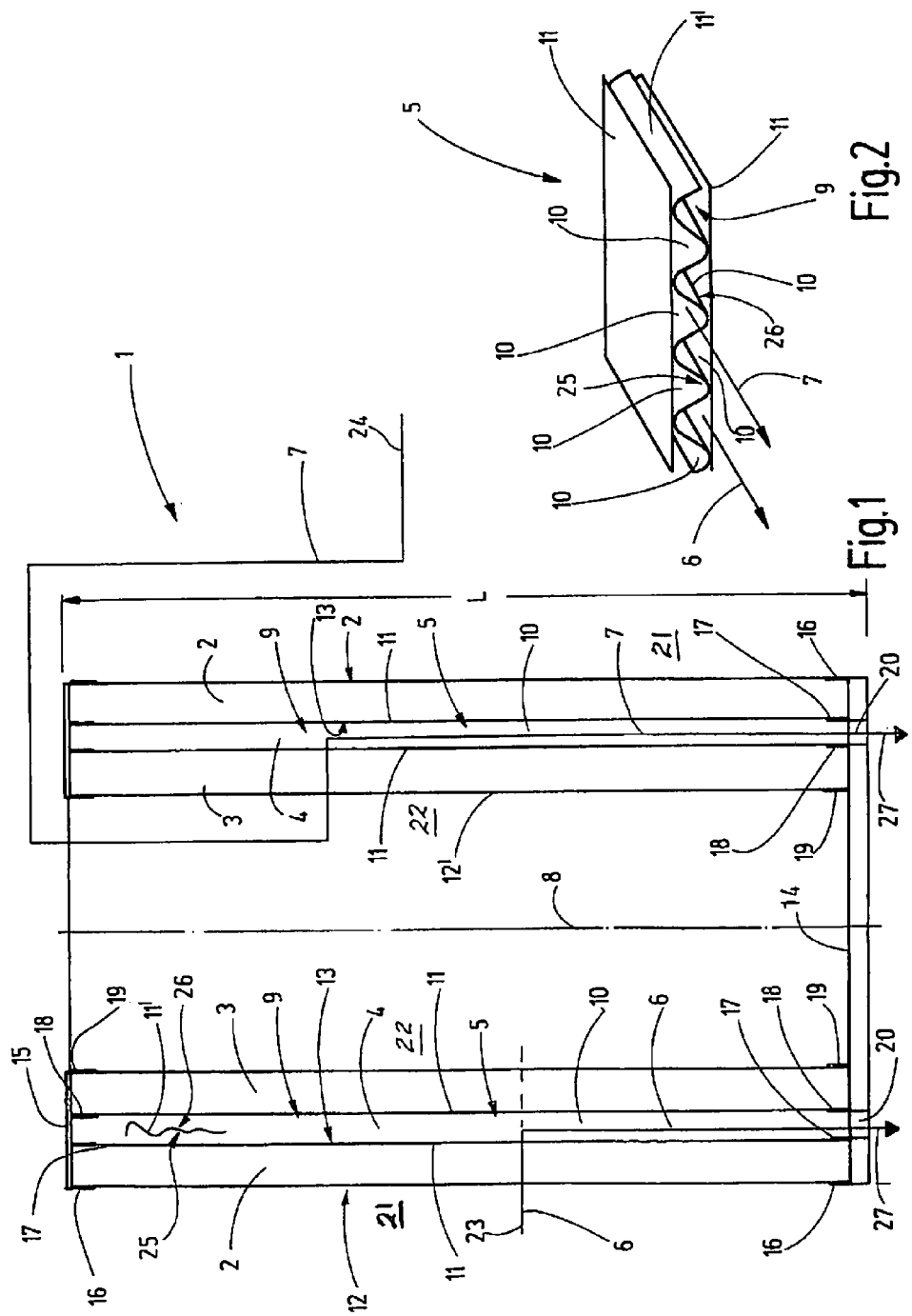

FILTER

FIELD OF THE INVENTION

The invention relates to a filter comprising at least one first filter medium and one second filter medium defining therebetween a flow space receiving a device for separation and flow guidance. The device divides the space such that one functional space at a time is adjacent to the first filter medium and the second filter medium. The first filter medium defines a cavity to the outside. The second filter medium defines a cavity to the inside. The cavities each are connectable to at least one fluid duct.

BACKGROUND OF THE INVENTION

DE 31 03 723 A1 discloses that filter. The known filter for liquids has two depth filter tubes that are concentric to one another and that are arranged between a first cover and a second cover. The cover end faces are connected parallel to one another between a feed inlet and an outlet. An annulus is formed between the two depth filter tubes. In the annulus is a spacer consisting essentially of a cylindrical tube part with a corrugated wall and fixing the locations of the two depth filter tubes relative to one another. The corrugated wall of the tube part divides the annulus into outlet channels and feed inlet channels of roughly the same size. The feed inlet channels face the inner depth filter tubes and are open downward, and thus, are connected to the feed inlet. The outlet channels face the outer depth filter tubes and are open upward toward the cover. The thickness of the annulus can be kept relatively small in this design of the spacer, with the flow resistance remaining relatively low.

The known filter works as a depth filter with the two depth filter tubes being connected parallel to one another to achieve a relatively long service life. The hydraulic fluid flowing into the housing through the feed inlet flows past the outer edge of the first cover into the annulus between the housing and the outer filter tube. One part of this hydraulic medium flows radially through the outer depth filter tube and travels cleaned into the outlet channels, and then flows up and between the first cover and the top end to the outlet. Another part of the uncleaned hydraulic fluid flows from underneath into the feed channels of the spacer. From there, it flows radially through the inner filter tube and via a perforated sheet metal cylinder likewise to the outlet.

Filters are known in a plurality of embodiments and sizes for the most varied applications for filtering and cleaning of liquid or gaseous fluids. The prior art includes filter devices having a single hollow cylindrical filter element within a filter housing. Fouled liquid is supplied via an inlet of the filter housing and flows through the filter medium from the outside to the inside. The filtered liquid is then discharged via a fluid outlet in the filter housing for further use. To prevent disruptions in operation, especially when the pressure difference between the fluid inlet and fluid outlet rises when the fluid outlet is clogged by fouling, filters of this type have a bypass valve as a possible bypass device. In this case, the uncleaned fluid can then be relayed directly to the fluid outlet.

WO 02/062447 A1 discloses a filter in which, during normal operation, i.e., with the bypass valve closed, the fluid to be cleaned first flows through a first filter medium from the outside to the inside. Coaxially to the first filter medium, a second filter medium in turn surrounds an inner second cavity from which cavity the fluid can drain via a fluid outlet of the filter housing. When the bypass valve is opened as a result of a clogging of the first filter medium, the uncleaned fluid enters the first filter cavity via the bypass valve, flows through the second filter medium from the outside to the inside, and then emerges cleaned from the fluid outlet of the filter housing. In normal filter operation, in addition to a coarse filtration by the first filter medium, fine filtration can be achieved by the subsequent second filter medium.

Filters are known that define two flow paths parallel to one filter medium at a time for the fluid entering a filter housing. A first filter medium and a second filter medium are preferably arranged coaxially to one another in a common filter housing. Uncleaned fluid is incident on the filter media at the same time from their outside. For filter media through which flow has taken place at the same time in operation, the filter surface is increased by 50% or more compared to known single element solutions. However, the known technical design measures are suited to a limited degree to achieving a longer service life of the filter and to cleaning different fluids with the same filter.

SUMMARY OF THE INVENTION

An object of the invention is to provide an improved filter whose structural space is efficiently used and enables simultaneous filtration of various fluids during a filtration operation. Improved fluid passage through the filter is achieved, and operating behavior is improved.

According to the invention, this object is basically achieved by a filter having the flow space with its two functional spaces connected to at least one other fluid duct separated fluid-tight from the other fluid ducts. This arrangement yields the advantage that the first filter medium and the second filter medium can be alternately connected in series or in parallel and/or can be supplied with a single fluid flow or with a first fluid flow and at least one second fluid flow separated from the first fluid flow, or flow can take place through the media in the same or the opposite direction. In this way, the filter according to the invention can be used alternatively for separate filtration of various unfiltered substances or for incremental filtering of an unfiltered substance. Possible applications for the filter according to the invention are extremely varied due to the different flow directions or feed possibilities of the unfiltered substance and due to the evacuation of the filtrate from the filter.

A first fluid flow can be routed to the first filter medium and a second identical fluid flow or one which is different from the first fluid flow can travel at the same time to the second fluid medium through the device for separation and flow guidance of a first fluid flow for the first filter medium from a second fluid flow through the second filter medium. In this connection, the first filter medium can be used for prefiltration or coarse filtration of a fluid flow. After passage, the filtrate can be subjected to a further filtration, especially fine filtration, using the second filter medium. The service life of the filter may be extended in this way.

With a filter according to the invention, simultaneous filtration of two different fluids or media can also be undertaken. The flow guidance device can separate the first fluid flow from the second fluid flow, and then routes the first fluid flow to the filter medium assigned at the time for a separate filter process. This design measure also permits widening the range of possible applications of the filter by allowing for two or more different types of fluid flow to be filtered at the same time with this filter.

The filter media can be designed as surfaces, like flat layers with the device for separation and flow guidance of the two fluid flows interposed. The first filter media and second filter media can be arranged concentrically to one another, for example, in the manner of a cylindrical filter cartridge. The flow space formed by the device for separation and flow guidance is provided cylindrically between the filter media.

The device for separation and flow guidance enables, for example, an unfiltered substance that, when flowing through the first filter medium from the outside to the inside, viewed in the radial direction of the filter, flows through the first filter medium, to be able to drain out of the filter in this respect. A second filtrate, formed in the filter for flow of the second filter medium from the inside to the outside, can at the same time separately from the first filtrate be discharged from the filter separately from the first filtrate by the device for separation and flow guidance of fluid flows. The flow space formed between the filter media can be divided into two or more regions functionally separated from one another. The functionally separate regions can be formed by, for example, channels can be located next to one another and alternately open to the first filter medium and to the second filter medium. The channels can be used for discharge of the filtrate and for delivery of the unfiltered substance to the first and second filter media.

The channel ducts separated from another can be formed from, for example, corrugated individual channels extending between two boundary walls. The boundary walls in turn define the respective inner and outer walls of the filter media and can have a porous or a perforated structure. After the fluid passes through the boundary walls, the channels relay the fluid separately in this case. The pertinent fluids can all be present as an unfiltered substance or mixed as a filtrate and as an unfiltered substance. The fluid flows can have flow directions that are different relative to one another in the channels or can have the same flow directions. If, for example, the fluid flows have different temperatures, the device according to the invention for separation and flow guidance of the first and second fluid flows allows routing of these flows by the counterflow principle for purposes of heat transfer to the medium that is colder at the time.

To enable a filtration to be carried out with two or more filter stages, the first filter medium is advantageously designed with a filter fineness differing from that of the second filter medium. Thus, the first fluid flow present as an unfiltered substance can be routed by the device for separation and flow guidance to, for example, the first filter medium. The fluid that has been partially filtered by the first filter medium can be relayed from the first filter medium to the second filter medium and optionally to other filter media. The flow guidance device in this way enables a series connection of at least two filter media in a single filter housing.

The filter media can be made in many different ways depending on the material properties of the fluid to be filtered. Thus, for example, the nonwovens used can be formed of polymer fibers or filaments. The materials used are preferably polyolefin, especially polyethylene and/or polypropylene, as well as polyester, especially PBT and/or PET.

The filter media can be produced in the conventional manner, such as, for example, a spun bond nonwoven or staple nonwoven fabric by the wet or dry folding method.

Moreover, the filter layers can also be produced by melt blown methods or can be made as nanofibers. In addition to so-called filter papers, mineral nonwoven fabrics or glass nonwoven fabrics can be used. In the case of mineral fibers, for example, nonwoven fabrics based on aluminosilicate fibers, ceramic fibers, dolomite fibers, or fibers of basalt and the like can be used. In the case of the glass nonwoven fabrics, all types of glass can be used, such as E glass, S glass, M glass or C glass. The filter media can also be pleated or can have another surface shape.

Advantageously the pore size or filter fineness of the filter media can vary over their depth. Thus, the filter fineness on the feed side for the unfiltered substance can be smaller than on the exit side of the filtrate of the respective filter medium.

Especially preferred, the two filter media or other filter media are axially arranged between a bottom part and a cover part of the filter. The filter can be assembled modularly. The filter can be jointly removed from the filter housing from first and second filter media with the flow guidance device and can also be re-inserted.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and that are schematic and not to scale:

FIG. 1 is a front elevational view in section of a filter according to one exemplary embodiment of the invention; and FIG. 2 is a perspective view a partial extract of a flow guidance device, using filter media defining a flow space between them, as shown in FIG. 1.

DETAILED DESCRIPTION OF THE INVENTION

FIG. 1 shows in an extract in a schematic view, not to scale, a filter 1 for separate filtration of various unfiltered substances or for incremental filtration of an unfiltered substance. The filter 1 has a first filter medium 2 and a second filter medium 3. The filter media 2, 3 are preferably nonwovens of polymer fibers with two different filter finenesses. The second filter medium 3 should preferably have a greater filter fineness than the first filter medium 2.

In the exemplary embodiment shown in FIG. 1, the filter media 2, 3 are made as tubular, especially cylindrical, components. The first filter medium 2 and the second filter medium 3 have identical axial lengths L and are located in the filter 1 with a uniform radial distance to one another. A disk-shaped flat bottom part 14 has a peripheral edge 16 and another edge 17 offset to the inside in the radial direction to a longitudinal axis 8 of the filter 1. The peripheral edge 16 and the edge 17 have the same heights and are connected in a sealed manner to an end section of the outer first filter medium using a cement bond (not shown). The second filter medium 3 is fixed in the same way with its end section between edges 18, 19 that project out of the bottom part 14.

A cover part 15 opposite the bottom part 14 on the other axial end of the filter 1 is made comparatively annular in shape. The cover part 15 has a width corresponding to the thickness of the two filter media, plus the radial distance of the filter media 2, 3. In the same way as for the bottom part, the edges 17, 18, 19 and the outer peripheral edge 16 are located on the cover part 15 and ensure positive and bonded fixing and spacing of the two filter media 2, 3. The bottom part 14 has openings 20 between the two filter media 2, 3 through which fluid flows 6, 7 can be fed or drained between the filter media 2, 3 around the entire periphery of the bottom part.

The first filter medium 2 defines an annular first cavity 21 to the outside; the second filter medium 3 defines a likewise annular second cavity 22 to the inside. The two cavities 21, 22 can be connected to one fluid duct 23, 24 at a time, or, more accurately, the first cavity 21 to the first fluid duct 23 and the second cavity 22 to the second fluid duct 24. The two cavities 21, 22 can also be to a common fluid duct 23 or 24.

FIG. 1 shows the different flow directions or feed possibilities for the unfiltered substance and the evacuation of the filtrate from the filter 1. The first fluid flow 6 can be routed, for example, from the radially outer peripheral surface or side 12 of the filter 1 to the first filter medium 2. After passage through the first filter medium 2 to its output side 13 into a device 5 for flow guidance and separation, the flow can be drained to the bottom part 14 and from there through the openings 20. A second fluid flow 7 can be routed at the same time from the inside 12' of the filter 1 radially to the outside to the second filter medium 3. After passage through the second filter medium 3 and into the device 5 for flow guidance and separation, the flow can be drained through the openings 20 through the bottom part 14 and can be supplied in this respect to another connection. The second fluid flow 7 can also be formed by the filtrate of the first filter medium 2 so that the first and second filter media 2, 3 are connected in series in this operation of the filter 1.

The device 5 for flow guidance and separation from a first fluid flow 6 and a second fluid flow 7 is shown in FIG. 2 by way of an extract. The device 5 preferably includes plate-shaped, thin-walled channel ducts 9, that are formed in the manner of a corrugated or web plate, with individual channels 10 extending next to one another and parallel to a longitudinal axis 8 of the filter 1. The individual channels 10 in the illustrated exemplary embodiment have an essentially triangular cross section. The individual channels 10 are defined by one boundary wall 11 at a time, which boundary walls are located opposite relative to the individual channels 10. The boundary walls 11 are fluid-permeable in the sense that they can let particles and the carrier liquid of the fluid flows 6, 7 pass.

The flow guidance device 5 can be made from a plastic or metal material that acts inertly relative to the fluid flows which are to be filtered. This device enables the separate take-up and discharge of fluid flows 6, 7 with reference to the filter media 2, 3. The boundary walls 11 can be formed from flat, perforated plates. The individual channels 10 are formed of a sheet metal or thermoplastic plate formed into a corrugated profile or member 11'. For the sake of simplicity, this perforation is, however, omitted in FIG. 2. The plates and the formed corrugated profile can be connected together by bonding or by cementing. The boundary walls 11 and the channel ducts 9 or individual channels 10 can also be formed in one piece from thermoplastic as an injection molding, as FIG. 2 illustrates. The filter media 2, 3 can be connected to the device 5 for flow guidance and separation by bonding or by cementing or positively as well as non-positively by corresponding forming with narrow tolerances to the device for flow guidance and separation. Thus, a manageable unit can be formed from the two filter media 2, 3 and the device 5 for flow guidance and fluid separation. The individual channels 10 can also be made rectangular or square, instead of the triangular cross sectioning by the corrugated profile 11'.

The device 5 or, more accurately, its corrugated profile 11', defines a first functional space 25 and second functional space 26 of channel ducts 9 or individual channels 10. The functional spaces 25, 26 are located between the boundary walls 11 and divide the flow space 4 accordingly in the inserted state of the device 5 for separation and flow guidance. The first functional space 25 is adjacent to the first cavity 21. The second functional space 26 is adjacent to the second cavity 22. The two functional spaces 25, 26 can be connected to another fluid duct 27 via openings 20 on the bottom-side end of the filter 1. Two other fluid ducts for the first functional space 25 and the second functional space 26 can be provided. The other fluid duct 27 made as an outlet is separated fluid-tight from the fluid ducts 23, 24 made as feed inlets.

The fluid flow directions in the exemplary embodiment shown in FIG. 1 are the same in the individual channels 10, where a filtrate has formed after passage through the first filter medium 2 and the second filter medium 3. The device 5, as shown in FIG. 2, can be inserted concentrically in the cylindrical flow space 4 such that the respective inside of filter medium 2 and the outside of filter medium 3 can be supported in a compressively stable manner on the adjacent perforated boundary walls 11. The intermediate wall material braces the individual channels 10 peripherally and fully opposes the pressure acting from the outside in this respect and the pressure acting from the inside. In this way, an especially braced filter unit as a manageable component can be achieved.

Instead of the concentric arrangement shown in FIG. 1, filter medium 2 and filter medium 3 can also be designed as plate material in the manner of a stack filter. The flow space 4 is then created and filled by the assigned device 5. In addition to an illustrated arrangement with only two filter media 2, 3, the possibility exists of comparably assembling yet other filter media, not detailed, in a concentric or stacked arrangement into a filter 1.

The two filter media 2, 3 can be fed equally with an unfiltered substance through the openings 20 in the bottom part 14. Conversely to the illustrated arrow direction, the flow of unfiltered substance from the inside to the outside can be supplied to the filter medium 2 via the flow space 4 in turn through the device 5 separately from one another or can pass through the filter medium 3 transversely to the direction of the longitudinal axis 8. Only one filter medium 2 or 3 can be supplied in this way with the unfiltered substance via the opening 20 and to still supply the filter medium 3 or 2, whichever is the other one at the time, as described for filtrate discharge, then the other corresponding openings 20.

While one embodiment has been chosen to illustrate the invention, it will be understood by those skilled in the art that various changes and modifications can be made therein without departing from the scope of the invention as defined in the appended claims.

What is claimed is:
1. A filter, comprising:
a first filter medium;
a second filter medium spaced from said first filter medium;
a flow space between said first and second filter media;
a separation and flow guidance device in said flow space, said device having a perforated first boundary wall engaging an inside surface of said first filter medium, having a perforated second boundary wall engaging an outside surface of said second filter medium and having first and second duct channels between said boundary walls, said first duct channels being open to said first boundary wall to be in fluid communication with said first filter medium via said first boundary wall and being closed to said second boundary wall to not be in fluid communication with said second filter medium via said second boundary wall, said second duct channels being open to said second boundary wall to be in fluid communication with said second fluid medium via said second boundary wall and being closed to said first boundary wall to not be in fluid communication with said first filter medium via said first boundary wall; and
a corrugated member located between and fixedly attached to said boundary walls to define said duct channels.

2. A filter according to claim 1 wherein
said first and second filter media are cylindrical with said first filter medium concentrically surrounding said second filter medium.
3. A filter according to claim 1 wherein
said first filter medium surrounds said second filter medium.
4. A filter according to claim 1 wherein
said first and second filter media have sufficient filter finenesses.

* * * * *